Oct. 17, 1950    LE ROY V. JACOBSEN ET AL    2,526,484
WHEEL BALANCE CHECKING APPARATUS
Filed Feb. 11, 1947                                2 Sheets—Sheet 1
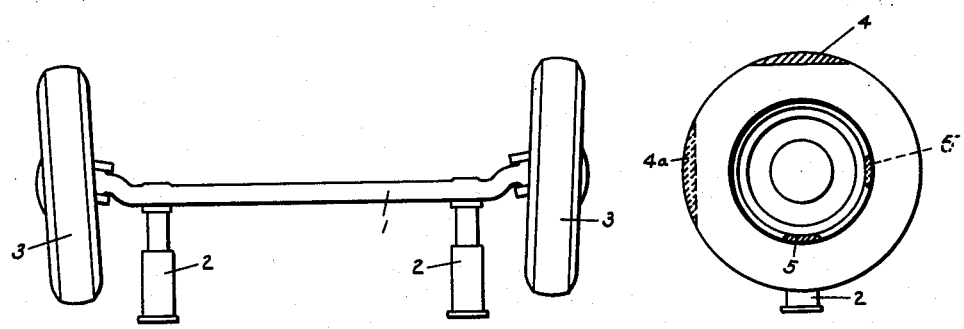
FIG-1      FIG-2
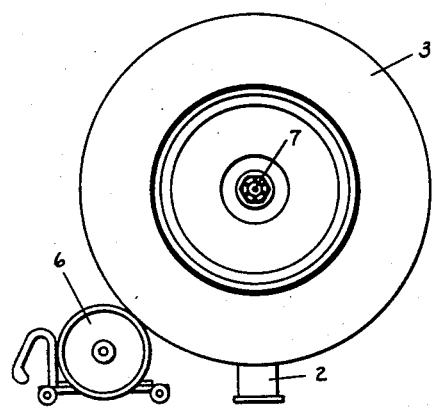 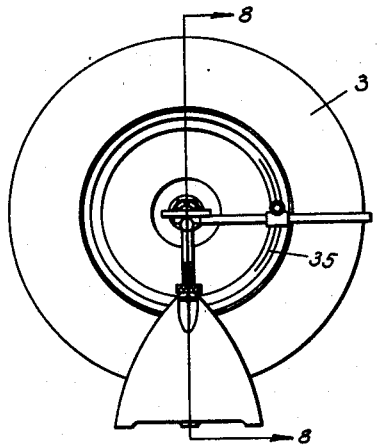
FIG-3      FIG-4
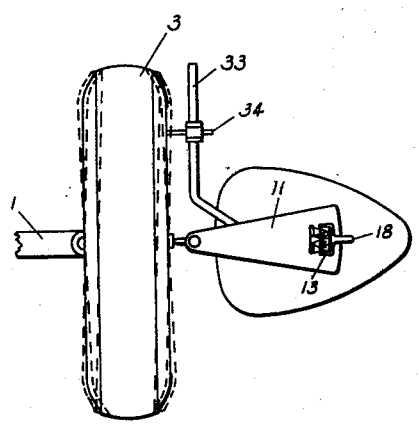 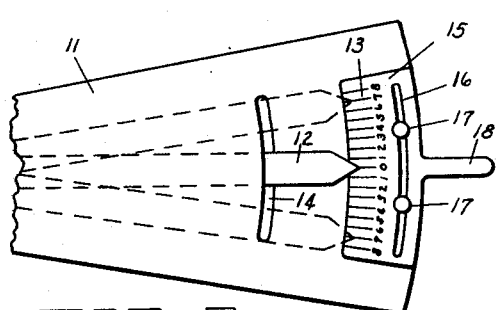
FIG-5      FIG-6
INVENTORS
LE ROY V. JACOBSEN
G. G. GOSLINE
By Merrill M. Blackburn Oct. 17, 1950    LE ROY V. JACOBSEN ET AL    2,526,484
WHEEL BALANCE CHECKING APPARATUS
Filed Feb. 11, 1947      2 Sheets-Sheet 2
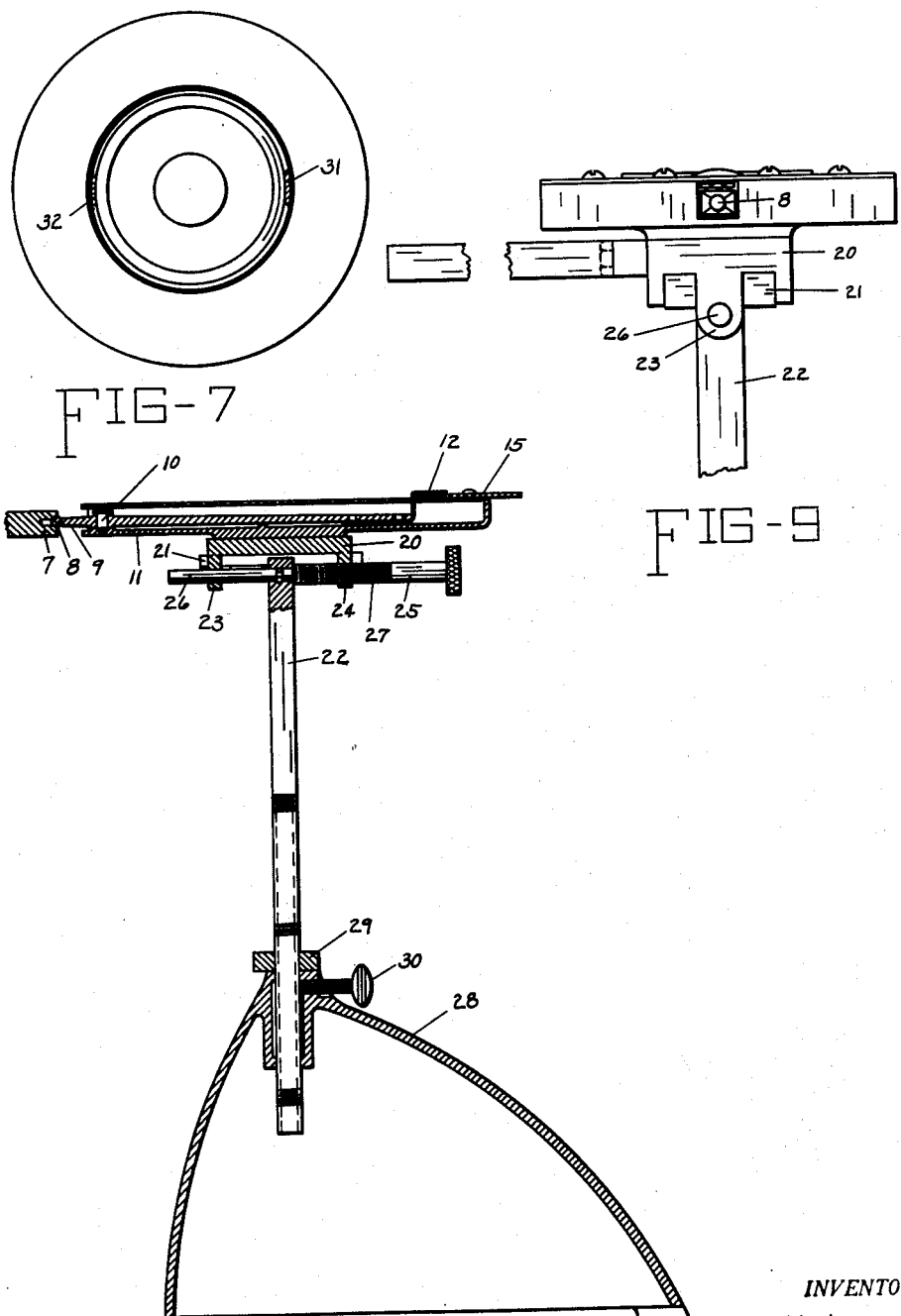
INVENTORS
LeRoy V. Jacobsen
G. G. Go Sline
By Merrill M. Blackburn Patented Oct. 17, 1950

2,526,484

UNITED STATES PATENT OFFICE 2,526,484

WHEEL BALANCE CHECKING APPARATUS

Le Roy V. Jacobsen, near Bettendorf, Iowa, and Gilbert G. Go Sline, Rock Island, Ill., assignors to Bee-Line Company, Scott County, Iowa, a copartnership Application February 11, 1947, Serial No. 727,790

5 Claims. (Cl. 73—66)

Our invention relates to apparatus for and method of balancing motor vehicle wheels and among the objects thereof are the provision of an improved apparatus for the purpose stated; the provision of improved apparatus for indicating, when determining dynamic unbalance of a wheel, the approximate location of the unbalanced weight; the provision, in an apparatus of the character indicated, of means for indicating the amount of weight which needs to be added to a wheel to correct dynamic unbalance; and such further objects, advantages, and capabilities as will hereafter appear and as are inherent in the construction disclosed herein. Our invention further resides in the combination, construction, and arrangement of parts illustrated in the accompanying drawings and, while we have shown therein what is now regarded as the preferred embodiment of this invention, we desire the same to be understood as illustrative only and not to be interpreted in a limiting sense.

In the drawings annexed hereto and forming a part hereof,

Fig. 1 represents a vehicle front axle and its attached wheels, in front elevation;

Fig. 2 represents a side view of a vehicle front wheel supported above the ground, said view illustrating the first step in the process of balancing a wheel, namely, the correction of static unbalance;

Fig. 3 illustrates the step of spinning a wheel, which constitutes one step in correcting dynamic unbalance of a vehicle wheel;

Fig. 4 is a side elevation corresponding to Fig. 3 and shows the next step in the method of correcting dynamic unbalance;

Fig. 5 is a fragmentary plan view showing what happens during the testing of a wheel for dynamic unbalance;

Fig. 6 is a fragmentary plan view, on an enlarged scale, of a part of the apparatus shown in Fig. 5;

Fig. 7 is a side elevation illustrating how weights are placed when correcting dynamic unbalance;

Fig. 8 represents a central vertical section substantially along the plane indicated by the line 8—8, Fig. 4, with the wheel omitted; and Fig. 9 is a side elevational view of the upper part of the apparatus shown in Fig. 8, looking at the left side thereof.

Reference will now be made in greater detail to the annexed drawings for a more complete description of this invention. In checking the balance of vehicle wheels, it has been the usual practice to remove the wheels from the spindles and place them on a machine by means of which they could be caused to spin rapidly. Removing the wheel from the spindle separates it from the spindle and brake drum, thus introducing possible errors into the determination of the wheel unbalance. In addition to this, an advantage which is gained by checking the wheel in place on the spindle is the time-saving which is made by not having to remove and replace the wheels.

As is apparent from Fig. 1, the front axle of the vehicle is raised and supported so that the wheels are clear of the floor or runways upon which the checking may be done, or any other supporting medium upon which the vehicle may be. In Fig. 1, the axle 1 is shown as supported upon a pair of jacks 2, but any other convenient support may be used, as desired. If the brakes are released so that the wheels 3 are free to turn, any unbalanced weight of the tires will cause them to turn until the heavy part of the tire is at the bottom. When the wheel comes to rest, the unbalanced weight, indicated diagrammatically at 4, will be at the bottom. A static balance weight, indicated at 5, is then attached to the wheel rim directly above the spindle. It is customary to make this application temporary so that weights of different amounts may be applied to the rim until the required amount has been found. When this has been done, the wheel may be turned about its spindle to any position, as indicated in Fig. 2 by the broken lines 4a, and, when it is stopped in any position and left free to turn, it will remain stationary, provided the proper amount of weight has been added. If it does not remain stationary, this indicates that either not enough or too much weight has been added. When the wheel remains stationary in any position to which it may be turned, then static balance has been attained and one may proceed with the checking of dynamic balance.

For a description of this, we now refer to Fig. 3 and the following figures. In order to avoid confusion, no static balance weight is shown in these figures; it being assumed that the wheel is perfectly balanced, statically. A suitable motor, provided with a tire-contacting driving pulley, as indicated at 6, is now run into position with the driving pulley in contact with the tread of the tire, and this motor is set into operation to cause spinning of the wheel 3 about its spindle 7. When the wheel is spinning sufficiently rapidly, the motor with the pulley 6 is withdrawn and the wheel is permitted to continue spinning. The checking apparatus, shown in Figs. 4, 5, 6, and 8, is then put into position with the ball 8, on the short end of lever 9, located in a depression in the end of the spindle 7. Therefore, if there is any lateral wobble of the wheel, causing corresponding motion of the spindle, such motion will be transmitted to the lever 9 which is pivoted on the pivot member 10, mounted in the bottom of the housing 11. Secured to the second end of this lever 11 is a pointer 12 which travels over a scale 13 mounted on the top of the housing.

As shown most clearly in Fig. 6, there is a slot 14 in the housing top which permits the pointer 12 to swing back and forth with the vibration of the spindle. A scale 13 is marked on a plate 15 provided with an arcuate slot 16 through which extend rivets or pins 17, the function of which is to guide the plate 15 in its lateral movement on the housing 11. This plate is provided with a handle 18 by means of which it may be manipulated. The purpose of this is to make possible the easy adjustment of the plate since it is desirable to have the pointer swing equal distances on opposite sides of the zero line or swing entirely upon one side of the zero line. In Fig. 6, the pointer is shown in solid lines as pointing to the zero of the scale 13 and in broken lines to 7 on each side of zero. These graduations on the plate 15 indicate ounces of weight to be added to the wheel to produce dynamic balance thereof. When the pointer swings on both sides of zero, it is necessary to take the sum of these readings in order to determine the amount of weight to be added to the wheel. In the example shown in Fig. 6, fourteen ounces (14 oz.) of weight would be required, since the pointer is shown as swinging to the seven-ounce line on each side of zero. On the other hand, if the amount of correction is small, for example, somewhere between one and seven ounces, the plate 15 can be moved to one side or the other until the limit of motion of the pointer in one direction is zero. Then the figure indicating the limit of motion in the opposite direction will be the number of ounces of weight to be added to the wheel to produce dynamic balance.

As shown in Fig. 8, the housing 11 is mounted on a support 20 and the two are secured together to move simultaneously. Beneath this support 20 are slideways 21 which are connected to the upper end of the screw-threaded standard 22 and prevent the support 20 and housing 11 from tilting laterally but, at the same time, permit them to slide longitudinally so that the ball 8 may be inserted into the depression in the end of the spindle 7. A pair of arms 23 and 24 extend downwardly from the support 20, and these arms are provided with openings for the reception of the screw 25. The forward end 26 of this screw is smooth and is rotatable in the hole through the arm 23. The other end portion of the screw 25 is screw-threaded, and the arm 24 is likewise threaded so that the screw passes therethrough to cause motion of translation of the support 20 and housing 11 with reference to the supporting post 22. A pin extending through the standard or post 22 and a groove in the smooth portion 26 of the screw prevent endwise motion of the screw with relation to the standard whereby to cause motion of the head, that is, housing 11 and support 20, with relation to the post 22.

The base 28 is heavy enough to normally prevent this tool from being tipped over inadvertently. As indicated above, the standard 22 is screw-threaded and has a nut 29 mounted thereon for vertical adjustment of the standard, together with the gauge mounted on the upper end thereof. A set screw 30 passes into the upper portion of the housing and engages the standard 22 to prevent motion thereof relative to the base after the instrument has been properly set for determining the dynamic unbalance of the wheel.

When the amount of weight needed has been determined, weights are added to opposite faces of the rim, upon opposite sides of the spindle, as indicated at 31 and 32 in Fig. 7. The use of two weights is necessary in order to prevent disturbance of the static balance of the wheel which would occur if only one weight were used in correcting dynamic unbalance. It is necessary that these weights be of equal amounts, upon opposite sides of the wheel, and the same distance from the spindle, so as to reduce wobbling thereof, as nearly as feasible to zero.

In order to indicate that part of the wheel which has the greatest lateral vibration, an arm 33, carrying a marker 34, is mounted on the side of the support 20 and, as shown in Fig. 5, extends out approximately parallel to the plane of the wheel. The marker 34 is adjustable along the arm 33 to position it properly with relation to the wheel, since wheels are of different sizes. The marker 34 may be a suitable crayon, pencil, or other marking device, and is so positioned that it will make as short a mark as convenient on the side of the wheel.

The kingpin of the wheel insures that the wobble of the wheel will be in an approximately horizontal plane. This results in the heavy part of the wheel moving in or out with relation to the vehicle in an approximately horizontal plane, perpendicular to the kingpin; the wheel spindle oscillating in this plane. The tendency is to cause the dynamic center of mass of the heavy part of the wheel to move outwardly or inwardly until it is in a plane with relation to which the mass of the wheel is in equilibrium. By adding equal weights to opposite sides of the wheel upon opposite sides of the spindle, as indicated at 31 and 32, in the plane indicated by the center of the gauge line 35, placed on the tire by the marker 34, and in the amount indicated by the scale 13, it is possible to bring the wheel into dynamic balance so that the wheel will not wobble when spun rapidly. As shown in Fig. 7, these weights are attached to the rim of the wheel and, being equal in amount and equally distant from the spindle, they do not disturb the static balance of the wheel.

While we have referred herein to the use of this device in connection with vehicle axles, it will be understood that that term is used in a broad sense, since it is possible to use this apparatus equally well with a vehicle having a knee action type of suspension, and the word "axle" must therefore be understood as comprising that type of construction, and it will of course be understood that the specific description of structure set forth above may be departed from without departing from the spirit of this invention as disclosed in this specification and as defined in the appended claims.

Having now described our invention, we claim:

1. A wheel balance checking apparatus comprising a heavy base adapted to be placed on a floor adjacent a wheel supported on a vehicle axle spindle, a standard rising from said base and supporting a graduated sector in a substantially horizontal position laterally of said wheel, a pivot member connected to said sector, and an indicator arm pivotally mounted on said pivot member to swing in a substantially horizontal direction with its indicating end in proximity to the graduations of the sector, the opposite end of the arm projecting in the opposite direction from the pivot member and adapted to be placed in contact with the end of the spindle of said wheel, said sector being rigidly connected to said standard, the standard being vertically adjustable whereby to adjust the short arm into horizontal alignment with the center of the end of the spindle.

2. A structure as defined by claim 1 having a supporting arm projecting from said sector in a direction approximately parallel to the lateral face of the wheel, and a marking element carried by said arm and adjustable lengthwise thereof whereby it may be so placed as to place a mark on the lateral wall of the wheel when it is spun about its spindle.

3. In a motor vehicle wheel balance checking device, a supporting standard weighted at its base and adapted by reason of its construction to stand substantially vertically at the side of a wheel supported in a raised position upon its spindle, a support connected to the upper end of said standard, a pivot member carried by the support and extending approximately perpendicularly thereto, an indicator arm pivotally mounted on said pivot member and adapted to swing thereabout in a substantially horizontal direction, said arm projecting in two directions from said pivot member and extending unequally in opposite directions from said pivot, the shorter end of the indicator arm extending into contact with the spindle of the wheel, a supporting member secured to said standard and projecting therefrom in proximity to the wheel being checked and approximately parallel thereto, a marking element carried by said supporting member, and a graduated member carried by said support in proximity to the indicator arm for cooperation therewith.

4. Mechanism for checking wheel balance comprising, in combination, a supporting unit having an upstanding standard, laterally extending supporting means on the upper end of the standard, a lever pivotally connected to the supporting means and swingable in a substantially horizontal direction in proximity to said supporting means, said lever having an arm projecting from its pivotal connection to the standard into position to contact the end of the axle spindle, and gauge means carried by said laterally extending supporting means for cooperation with said lever in indicating the amount of weight to be added to a wheel to reduce wheel unbalance substantially to zero.

5. Mechanism for checking wheel balance comprising, in combination, a supporting unit having an upstanding standard, laterally extending supporting means connected to the upper end of the standard, a lever pivotally connected to the supporting means and swingable in a substantially horizontal direction in proximity to said supporting means, said lever having an arm projecting from its pivotal connection to the standard into position to contact the end of the axle spindle, gauge means carried by said laterally extending supporting means for cooperation with said lever in indicating the amount of weight to be added to a wheel to reduce wheel unbalance substantially to zero, an arm extending from said standard approximately parallel to the medial plane of the wheel being checked, and a marker carried by said arm, said marker being positioned adjacent the wheel and adapted to place a mark on the side of the wheel when it is spun rapidly during a checking operation.

LE ROY V. JACOBSEN.
GILBERT G. GO SLINE.

REFERENCES CITED

The following references are of record in the file of this patent:

UNITED STATES PATENTS

| Number | Name | Date |
| --- | --- | --- |
| 980,800 | Kramer | Jan. 3, 1911 |
| 1,977,297 | Weaver | Oct. 16, 1934 |
| 2,134,500 | Bennett | Oct. 25, 1938 |
| 2,146,417 | Catalano | Feb. 7, 1939 |